[11] 3,609,283

[72] Inventor Bernard J. Costello
 Ringoes, N.J.
[21] Appl. No. 872,232
[22] Filed Oct. 29, 1969
[45] Patented Sept. 28, 1971
[73] Assignee Argus Engineering Company
 Hopewell, N.J.

[54] METHOD AND APPARATUS FOR SOLDERING INSULATED WIRE
 9 Claims, 6 Drawing Figs.
[52] U.S. Cl............................................. 219/85,
 219/347, 250/42, 350/190
[51] Int. Cl........................................ B23k 1/02
[50] Field of Search............................ 219/85,
 347, 349, 354, 388, 404, 411, 525; 228/1, 4, 47;
 250/42; 350/190

[56] References Cited
 UNITED STATES PATENTS
 3,051,826 8/1962 Avila........................... 219/85 X
 3,283,124 11/1966 Kawecki...................... 219/85 X
 3,305,157 2/1967 Pennings..................... 219/85 X
 3,529,117 9/1970 Costello...................... 219/85

Primary Examiner—J. V. Truhe
Assistant Examiner—L. A. Schutzman
Attorney—Ostrolenk, Faber, Gerb & Soffen ABSTRACT: A method and apparatus for stripping and soldering very fine insulated wire. A number of such wires may be stripped and soldered simultaneously whereby the insulated wires are each positioned above an associated terminal pad, a radiation transparent rod is firmly urged against all of the wires and is vibrated preferably in a reciprocating fashion, in a direction parallel to the length of the wires, substantially simultaneously with the application of radiation from a heat source which simultaneously irradiates all of the wires and their associated pads through the radiation-transmissive element. The radiation focused upon the wires causes a solder predeposited upon the terminal pads to melt and wet the pads, and also heat the wire whereby the insulation is softened to the point where it is split by the reciprocating force and is floated away by the solder which runs through the ruptured insulation and up and around the bare wire to form an excellent solder joint between the wire and pad, and wherein the heat applied is sufficient to form a good solder joint and yet insufficient to damage any neighboring heat-sensitive elements.

PATENTED SEP 28 1971 3,609,283
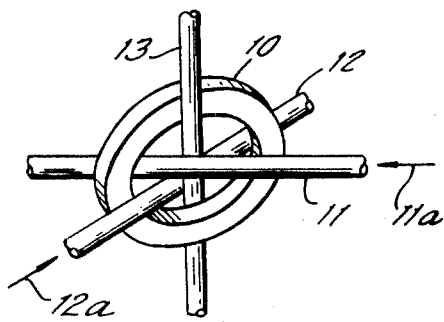
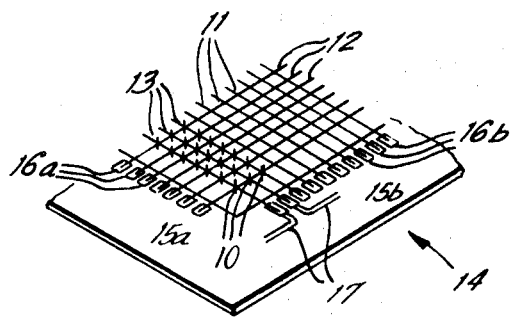
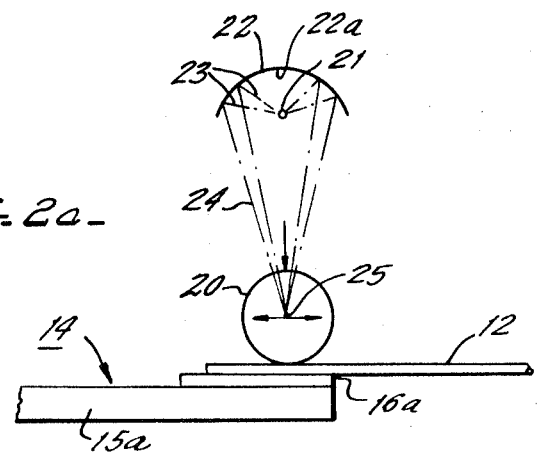
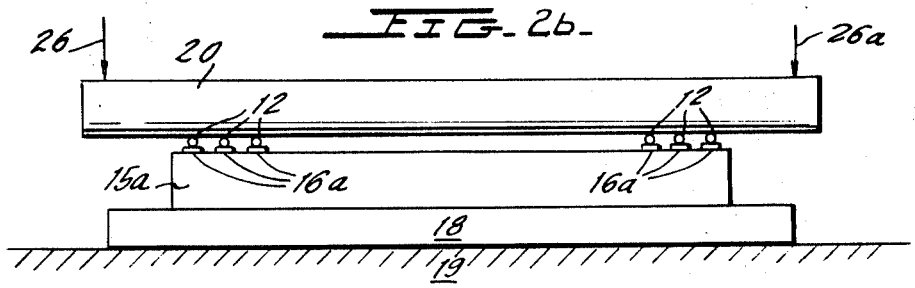
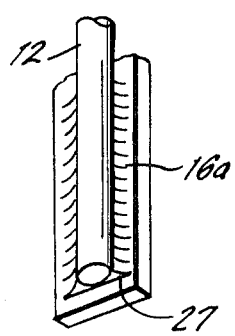
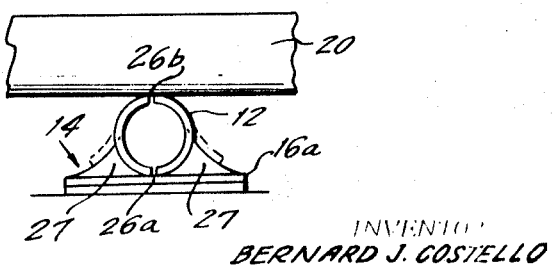
INVENTOR
BERNARD J. COSTELLO
BY
Ostrolenk, Faber, Gerb & Soffen
ATTORNEYS

METHOD AND APPARATUS FOR SOLDERING INSULATED WIRE

The present invention relates to fine insulated wire and more particularly to a novel method and apparatus for substantially simultaneously stripping and soldering fine insulated wire to a terminating member.

There exists a wide variety of applications in which it is desired to strip insulated wire of very small diameter and to solder the ends of the stripped wire to associated conductors or terminals.

Several types of insulation used on small diameter single strand wire are classified as heat-strippable. That is, the insulation may be removed by thermal means. One of the most commonly used stripping methods involves an operation which simply consists of utilizing a hot soldering iron that performs the dual function of stripping the wire while affecting a solder joint between the stripped end of the wire and an associated conductor or terminal.

The most common material used for such insulation is polyurethane which is coated or otherwise deposited upon the wire. Other plastics may be used in combination with polyurethane. One such plastic is Nylon whose purpose is to provide an insulation structure having good wear or abrasion resistance. "Nyleze" is a popular brand utilizing a combination of Nylon and polyurethane.

In general, insulation must be capable of being removed without leaving a residue or without degrading the solderability of the base wire. The published sublimation point or strip temperature of such insulation is generally in the range from 650°–725° F.

One specific application which led to the development of the invention described herein relates to the use of heat-strippable insulated wire in core-type computer memories. Magnetic cores used in such memory devices are small toroidal-shaped pieces of magnetic material that have the capability of being magnetically saturated in either of two magnetic states and of retaining either of these states indefinitely. That is, the cores may be magnetized or demagnetized, usually through electronic means. Conductors used for such switching and for performing the function of sensing or reading the state of cores, typically are threaded through the magnetic cores in two or more transverse directions.

Logic modules are typically composed of a large number of such cores which are threaded by the switching and sensing wires in an orderly array, usually referred to as a matrix. Arrays of this type are almost always cubic in structure. In the interest of packing density, it is desirable to use as small as possible a core with the smallest practical wire diameter. As a result, the cores and wires which are employed are quite small in size and diameter respectively, and are extremely fragile.

The cores and sensing and switching wires are typically arranged in layers of arrays, which arrays are stacked one upon another to form the third axis of the cubic structure. One of the initial steps in fabricating such arrays is to position the cores in any suitable temporary positioning means and then threading the wires therethrough in mutually perpendicular directions. The wires are typically terminated upon a "memory frame" to provide electrical contact to the external circuitry.

The most popular design technique for fabricating memory frames is that in which a printed wiring board formed preferably in the shape of a rectangular or square-shaped frame is provided with a plurality of traces arranged in spaced intervals around the frame, which spaced intervals are of the same spacing as the wires threading the core array. The wires are then attached to their associated trace by a soldering operation.

All of the wires in the array must be insulated from other wires in the array and also must be insulated from the cores. The insulation is ideally very thin to allow for maximum packing density. However, the insulation must be wear-resistant to withstand the constant abrasion of the cores.

In the performance of the above-mentioned operations a number of problems exist. The wires must be soldered to their associated circuit traces, however:

1. the insulation is moderately heat-resistant thereby requiring an unusually hot soldering iron to effectively strip the insulation from the ends of the wire.
2. The hot soldering iron presents a hazard to the circuit board which may usually take the form of burning and delamination.
3. The use of a soldering iron which is heated at a level sufficient to strip the insulation exposes the hot solder and very thin wire to the risk of corrosion which tends to decrease the wire cross section and weaken the memory structure.
4. The density of the magnetic memory structure dictates the use of extremely slender circuit traces and narrow spacing between traces. This necessitates the use of a very small soldering iron and requires a highly skilled operator.
5. In addition to the closely spaced traces a large number of solder joints are required in each array. Forming solder joints by hand in a one-at-a-time fashion is expensive and further constitutes a tedious and fatiguing task.
6. Operator control of the stripping and soldering operations is of questionable reliability and repeatability. Present day efficiency of operators performing such precise and demanding tasks is dependent upon many uncontrollable factors, none of which have clearly assignable or predictable values.

The present invention is characterized by providing a novel method and apparatus for stripping and soldering one or a plurality of insulated wires to termination pads wherein the stripping and soldering operations occur substantially simultaneously to yield good solder joints at soldering temperatures well below those required when using soldering irons.

Steps of the present invention are comprised of depositing a solder alloy by any suitable method upon each of the termination pads;

in the case where core memories are being fabricated the wires are appropriately threaded through the magnetic cores and temporarily held in place so that each wire is positioned above its assigned termination pad;

a soldering flux is applied to each of the pads and its engaging wire;

the memory frame and wires to be soldered are firmly held in engagement with one another, preferably by means of a compliant pad positioned against the circuit frame on the side opposite to that which is to receive the wires and a rigid radiation-transmissive rod held against the wires;

the radiant energy-transmissive rod is reciprocated back and forth a predetermined number of times simultaneously with the focusing of radiant energy upon the energy-transmissive rod which, in turn, causes the passage of the radiant energy through the rod so as to impinge upon the wires and associated termination pads;

the reciprocating motion causes the heated insulation to split and radiant energy further causes the molten solder to melt and wet the terminal pad and the wire while floating away the remaining insulation in the area of the joint.

The level of the radiant energy is controlled to produce a temperature, in the wire, sufficient to soften the insulation and insufficient to cause it to burn or evaporate. Said temperature is much lower than that required to perform the soldering operation if the insulation removal is to be performed by thermal means alone and, therefore, the board and wire are not in jeopardy of being damaged or burned. Multiple solder joints may be simultaneously formed through the above technique, no operator control factor is presented and the reliability and repeatability of the technique are thereby greatly enhanced.

It is therefore one object of the present invention to provide a novel method and apparatus for soldering insulated wire to a terminal pad through the use of radiant energy heating devices which heats the terminal pads, wire and insulation, to a level sufficient to form a solder joint between pad and wire and insufficient to burn the insulation.

Another object of the present invention is to provide a novel method and apparatus for soldering insulated wire to a terminal pad through the use of radiant energy heating devices which heats the terminal pads, wire and insulation, to a level sufficient to form a solder joint between pad and wire and insufficient to burn the insulation and wherein the wire-holding means is scrubbed against the wires to facilitate splitting of the insulation and baring of the wire to allow solder-wetting and to provide a good solder joint.

These as well as other objects of the present invention will become apparent when reading the accompanying description and drawings in which:

FIG. 1 is a perspective view showing a magnetic core and a representative manner in which it is threaded by driving and sensing wires.

FIGS. 2a and 2b show end and side views respectively, of the structure employed for joining wires of the type shown in FIG. 1 to terminal pads. FIG. 2c shows a matrix arrangement of magnetic cores.

FIGS. 3a and 3b are perspective and end views respectively, showing the manner in which the insulation is removed and the manner in which the solder is formed around a wire and terminal pad when utilizing the apparatus of FIGS. 2a and 2b.

As was described hereinabove, the core memories are typically comprised of stacked planar arrays to form a cubic array wherein each planar array includes a plurality of magnetic cores arranged in matrix fashion to form a plurality of mutually perpendicular rows and columns. Each core in a planar array is preferably of a toroidal type 10, shown in FIG. 1, wherein the core is formed of a suitable magnetic material capable of being driven to either of two saturable states and retaining either of these states indefinitely. As one typical example, a row winding 11 threads core 10 and all other cores arranged on the same row occupied by core 10. A column winding 12 threads core 10 as well as threading all those cores occupying the same column as core 10. Drive windings 11 and 12 are arranged to be mutually perpendicular to one another. In one typical memory arrangement core 10 may be driven to one of the two possible states of saturation by "half-current" pulses applied to windings 11 and 12 in the current direction indicated by arrows 11a and 12a, respectively. This condition may be sensed by a sense winding 13 threaded through core 10 and other selected cores (not shown) for operating a suitable sensing circuit (not shown). Winding 13 is preferably arranged in a fashion so as to be mutually perpendicular with windings 11 and 12.

In the interest of maximizing packing density, it is desirable to use the smallest possible cores and the smallest practical wire diameter. As a result, the cores and wires utilized are extremely fragile. As shown in FIG. 3b, for example, a wire is typically comprised of a substantially cylindrical shaped conductive core 14 which may preferably be copper. The thickness of the wire is usually of the order of 2 to 6 mils. The wire is coated with a plastic material which may, for example, by polyurethane or polyurethane covered with a material such as Nylon to provide good abrasion and wear resistance. The material utilized may be likened to a varnish in both appearance and manner of application. The thickness of the coating is usually of the order of 0.1 to 0.2 mils.

In the fabrication of cubic memory structures, the cores and wires (of the type shown in FIG. 1) are typically comprised of a plurality of layers of arrays. Each of the arrays are then stacked one upon the other to form the third axis of the cubic structure. The first step in forming an array is that of positioning the cores in row and column fashion. The cores are then threaded by the wires which themselves are aligned in mutually perpendicular directions as described hereinabove. The wires are then terminated upon a memory frame to provide electrical contact to the external circuitry. The frames may be rectangular or square-shaped frames arranged to embrace the periphery of a planar array. The frame itself may take the form of a printed wiring board having a plurality of circuit traces arranged at spaced intervals around the frame and being of a spacing which is substantially equal to the spacing between the wires arranged to be soldered thereto. Each of the wires are then simply attached to their associated trace by a soldering operation.

Insofar as the wires are concerned, they must be insulated from other wires in the array and from the cores. The insulation should ideally be very thin to allow maximum packing density, while at the same time providing good wear resistance to withstand the constant abrasion of the cores FIG. 2c shows one "corner section" of a core matrix and memory frame wherein a portion of two adjacent sides 15a and 15b of a memory frame 14 is shown as having a plurality of traces 16a arranged at spaced intervals along side 15a and a plurality of traces 16b arranged at spaced intervals along side 15b. The memory frame is comprised of a suitable insulating substrate upon which conductive terminal pads or traces 16a and 16b are formed through any one of the methods conventionally employed to form printed wiring boards. The row windings 11 are shown as threading cores 10 of associated rows and having their right-hand ends (relative to FIG. 2c) overlying an associated trace or terminal pad of the group designated by numeral 16b.

A plurality of column windings 12 are each shown as threading cores 10 of associated columns and having their left-hand ends (relative to FIG. 2c) overlying an associated one of the circuit traces designated by the numeral 16a. Obviously, the circuit traces may be coupled to peripheral circuitry through additional conductors as shown by conductors 17, for example. The complete details of such additional conductive printed wiring forms have been omitted from FIG. 2c for purposes of simplicity. Additionally, only selected ones of the cores 10 have been shown in the matrix arrangement of FIG. 2c, it being understood that the intersection of each of the row and column windings 11 and 12, respectively, have a core positioned thereat.

FIGS. 2a and 2b show the apparatus utilized for both stripping away the wire insulation and soldering the wires to their associated terminal pads. One side 14 of the circuit frame is shown in FIGS. 2a and 2b as having a plurality of circuit traces 16a arranged at spaced intervals. The side 15a of frame 14 is positioned upon a pad of compliant or resilient material 18 whose resilience allows for irregularities in the board configuration. This pad is placed upon a suitable supporting surface 19 which may, for example, be a table or other work surface. Each of the wires 12 are positioned to overly an associated circuit trace 16a. An elongated radiation-transmissive quartz rod 20 which may, for example, be a cylindrical-shaped rod is urged against the wires 12 by suitable clamping means designated by arrows 26 and 26a so as to firmly urge quartz rod 20 downwardly to press each of the wires 12 into firm contact with their associated circuit traces 16a.

The bonding energy is derived from a heat source 2 which preferably may be an infrared heat source such as, for example, a quartz-iodine lamp of elongated structure. The lamp 21 which is also referred to in detail in copending application Ser. No. 860,158 filed Sept. 11, 1969 and assigned to the assignee of the present invention, is positioned so as to be substantially colinear with the focal line of a polished elliptical-cylindrical reflector 22 whose concave surface 22a may, for example, be a polished gold surface. However, any other suitable polished surface may be employed. The reflector concave surface is designed to reflect radiation 23 so that the reflected rays 24 are focused into a substantially straight line focal zone (not shown) which overlies the region in which the ends of the wires 12 overly their associated circuit traces 16a.

A layer of solder alloy (not shown) is preferably deposited by any suitable means upon the exposed surfaces of the circuit traces. Soldering flux (not shown) is applied to the pad and the immediately adjacent wire. The elongated quartz rod which is a transparent rigid member, is urged against the wires with sufficient force to hold each wire against its associated solder coated and flux-coated trace. In the embodiment shown in FIGS. 2a and 2b the rod is cylindrical in shape and is formed of quartz. The longitudinal axis of rod 20 is substantially parallel to the row of circuit traces and is aligned perpendicular to the individual wires 12 so as to simultaneously bear against each wire in the group of wires. The compliant board supporting surface or pad 18 permits the board to flex and thereby provide a force equalizing factor among the individual wires in the group.

Radiant energy from the source 21 is passed through the radiant energy-transmissive quartz member to produce a heating effect in the wires and circuit traces.

While heating, member 20 is moved back and forth preferably two to four times along the wire in a direction shown by arrows 25. This reciprocating motion causes the warm insulation to split, allowing the solder which has by then become molten, to wet the wire and float away the remaining insulation in the area of the joint to be formed between the wire and its associated circuit trace. It should be noted that the temperature level of the radiant heating device is insufficient to burn off or evaporate the insulation. The ultimate temperature experienced by the joint structure is much lower than that required to solder by conventional means to assure the fact that the board and wire as well as other adjacent heat-sensitive portions of the circuitry are not placed in any jeopardy. FIG. 3b shows the manner in which the stripping and joint forming occurs. The urging force of the quartz rod 20 causes the heated insulation to split at points 26a and 26b located at the bottom and top points of the wire respectively. The molten solder 27 wets the exposed wire surface and flows upwardly and under the insulation causing the split insulation to "float away" whereby the solder fills in the regions immediately adjacent the contact point between wire core 14 and terminal pad or trace 16a. FIG. 3a shows the form taken by the solder 27 after the insulation has been split and floated away and the solder has cooled to thereby yield an excellent solder joint.

The advantages of this method and apparatus resides in the fact that multiple joints may be formed simultaneously, that no operator control factor is present, and that as a result thereof, reliability and repeatability are greatly enhanced.

Whereas the above preferred embodiment states that the quartz rod which clamps the wires 12 to their associated circuit traces 16a is described as being reciprocated in a direction substantially parallel to the direction of the wires 12, the same end result may be achieved by scrubbing the quartz rod in a direction transverse to the alignment of each of the wires 12 or, alternatively, by pulsating the clamping force or by utilizing any of these motions in combination or employing movement at a higher frequency rate. For example, a transducer device may be positioned between the clamps and the ends of the quartz rods, which devices are capable of converting high-frequency electrical energy into mechanical motion to achieve the requisite scrubbing action.

Although the preferred embodiment described hereinabove teaches its advantageous use for fabricating magnetic core memory arrays, it should be understood that insulated thermal strip wire is employed in many other types of equipment. For example, such insulated thermal strip wire is used quite frequently in the coil industry and the method and apparatus described herein may be employed in a modified fashion for soldering such wire to coil lugs or other terminal pads. The same clamping and scrubbing technique described herein may be well applied in any situation where insulated wire having thermally strippable insulation is employed. Insofar as the simultaneous joining of a plurality of wires to their associated terminal pads are concerned, a whole line of such terminations up to 10 inches long can be completed in less than 5 seconds. Although in the preferred embodiment the energy level of the radiating device is preferably elevated to a level sufficient to both split the insulation and perform the soldering operation, as an alternative approach a lower heat level may be employed during the splitting operation after which time the heat level may be raised to a level sufficient to perform the soldering operation. In either technique, however, the ultimate temperature experienced by the joint structure is much lower than that required to solder by conventional means.

It can therefore be seen from the foregoing description that the present invention provides a novel method and apparatus for stripping heat strippable insulation from wires and substantially simultaneously soldering the stripped wires to terminal pads wherein the entire stripping and soldering operation is performed in a very brief interval of time to yield an excellent solder joint and wherein a large plurality of such stripping and soldering operations may be performed simultaneously.

Although there has been described a preferred embodiment of this novel invention, many variations and modifications will now be apparent to those skilled in the art. Therefore, this invention is to be limited, not by the specific disclosure herein, but only by the appending claims.

1. A method for bonding wire having heat-strippable insulation to a conductive terminal comprising the steps of:
   a. coating the conductive terminal with a predetermined amount of solder;
   b. positioning a portion of said wire upon said terminal;
   c. firmly holding said wire and said terminal into intimate engagement with a rigid energy-transmissive member having at least a portion of its surface engaging the insulation surface of the wire;
   d. focusing radiation upon said energy-transmissive member to pass therethrough for irradiation of the wire and the terminal in the region of engagement, the energy level of said radiation being sufficient to soften said insulation and melt the solder and heat same to a temperature sufficient to form a good bond between said engaged wire and terminal;
   e. scrubbing said rigid member across said wire a predetermined number of times to cause the insulation which has been softened by the radiant energy, to break away from the wire in the region of engagement with the terminal thereby enabling the molten solder flow between the wire and the insulation and form a good solder joint between the stripped wire and the terminal.

2. The method of claim 1 wherein step (d) further comprises the step of limiting the upper energy level of said radiation to prevent said insulation from burning or evaporating.

3. The method of claim 1 wherein step (a) further comprises the step of coating the engaged surfaces of the wire and the terminal with a solder flux.

4. A method for stripping heat-strippable insulation from wire comprising the steps of:
   a. positioning the wire upon a rigid surface coated with solder;
   b. firmly urging said wire into intimate engagement with the rigid surface with a rigid radiation-transmissive member having at least a portion of its surface engaging the insulation surface of the wire;
   c. focusing radiation upon said energy-transmissive member to pass therethrough for irradiation of the wire in the region of engagement, the energy level of said radiation being sufficient to soften said insulation;
   d. scrubbing said rigid member across said wire a predetermined number of times to cause the insulation which has been softened by the radiant energy, to break away from the wire in the region of the terminal thereby enabling the molten solder flow between the wire and the insulation and form a good solder joint between the stripped wire and the terminal, 5. Means for bonding, by infrared radiation, selected regions of first and second members arranged in a predetermined manner with the surfaces of said selected regions thereof being in surface contact, and wherein one of said members is a wire having heat-strippable insulation and the other member is coated with solder;
   holding means for maintaining said predetermined arrangement and for urging said selected regions into intimate contact;
   said holding means being positioned above said prearranged selected regions;
   infrared radiation means including a radiation source and means for focusing rays emanating from said source into a zone substantially encompassing said aligned selected regions, for heating the members and melting the solder;

said holding means being a rigid light-transmissive member passing said rays therethrough to said focal zone with relatively insignificant attenuation;

means for moving said light-transmissive member in a reciprocating fashion causing said light-transmissive member to scrub across the wire as it is being heated to thereby split the insulation and enable the molten solder to wet the stripped wire and bond it to the said other member.

6. The bonding device of claim 5 wherein said rigid light-transmissive member is formed of a material taken from the group consisting of quartz, sapphire, pyrex.

7. The means of claim 5 wherein said rigid light-transmissive member being an elongated rod having a substantially circular shaped cross section for concentrating the rays passing therethrough upon the selected areas being irradiated.

8. Means for bonding, by infrared radiation, selected regions of first and second members arranged in a predetermined manner with the surfaces of said selected regions thereof being in surface contact, and wherein one of said members is a wire having heat-strippable insulation and the other member is coated with solder;

holding means for maintaining said predetermined arrangement and for urging said selected regions into intimate contact;

said holding means being positioned above said aligned selected regions;

infrared radiation means including a radiation source and means for focusing rays emanating from said source into a zone substantially encompassing said aligned selected regions;

said holding means being a rigid light-transmissive member passing said rays therethrough to said focal zone with relatively insignificant attenuation;

one of said members being joined being a printed circuit board having a first plurality of conductive leads comprising said printed circuit pattern arranged in said selected region;

the other of said members comprising means having a second plurality of insulation coated heat-strippable conductive leads extending therefrom and each being aligned for surface contact with an associated one of said first plurality of conductive leads;

said holding means engaging and urging said second plurality of conductive leads into intimate surface contact with said first plurality of conductive leads;

means for moving said light-transmissive member in a reciprocating fashion causing said light-transmissive member to scrub across the wire as it is being heated to thereby split the insulation and enable the molten solder to wet the stripped wire and bond it to the said other member.

9. The bonding device of claim 7 wherein a layer of conformal material is positioned between the printed circuit board and a supporting surface to enable said board to flex and thereby distribute the force of the holding means upon the wires to be evenly distributed.